Feb. 3, 1942.    A. C. KORTE ET AL    2,271,560
FUEL PUMP MOUNTING
Original Filed April 20, 1940    4 Sheets-Sheet 1

INVENTORS
ALFRED C. KORTE
KENNETH LANNERT
Donald U. Rich
ATTORNEY

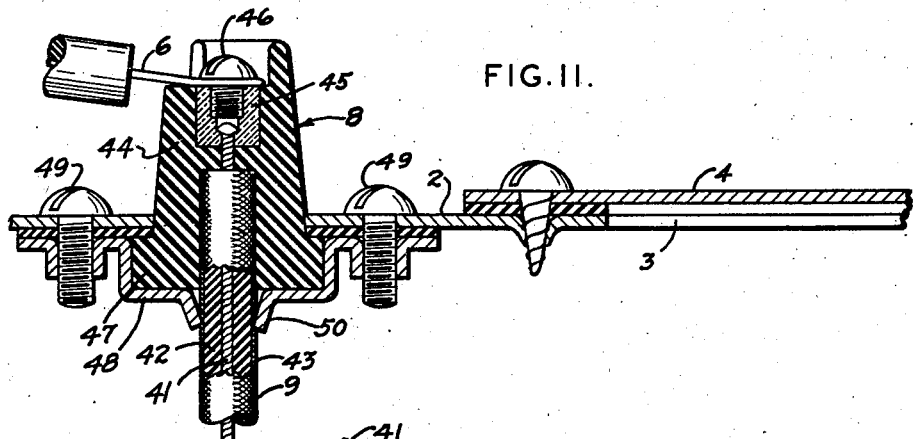
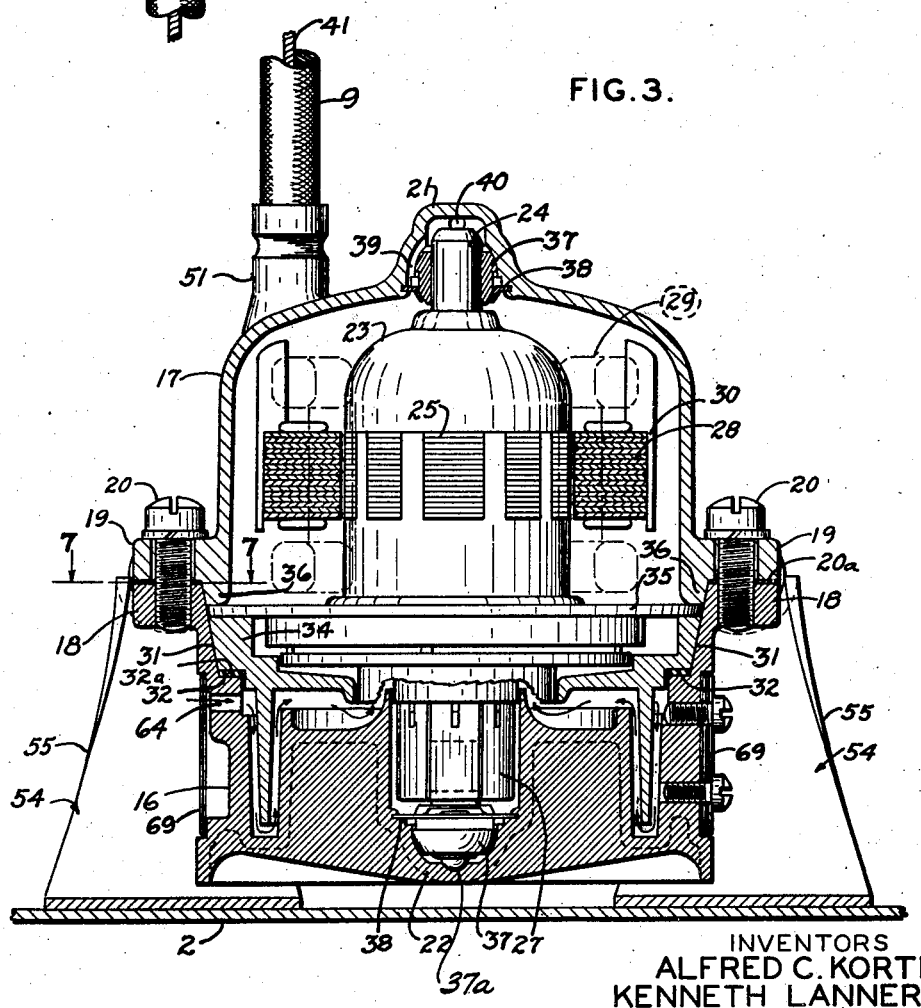

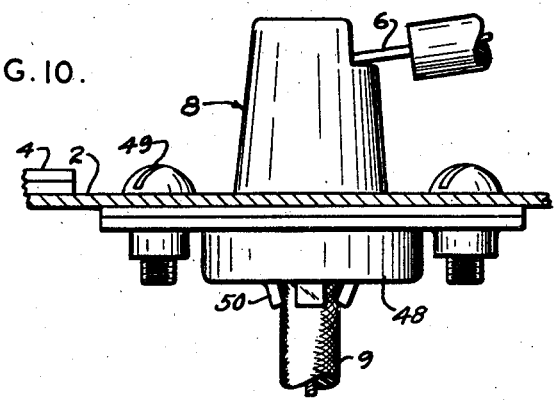
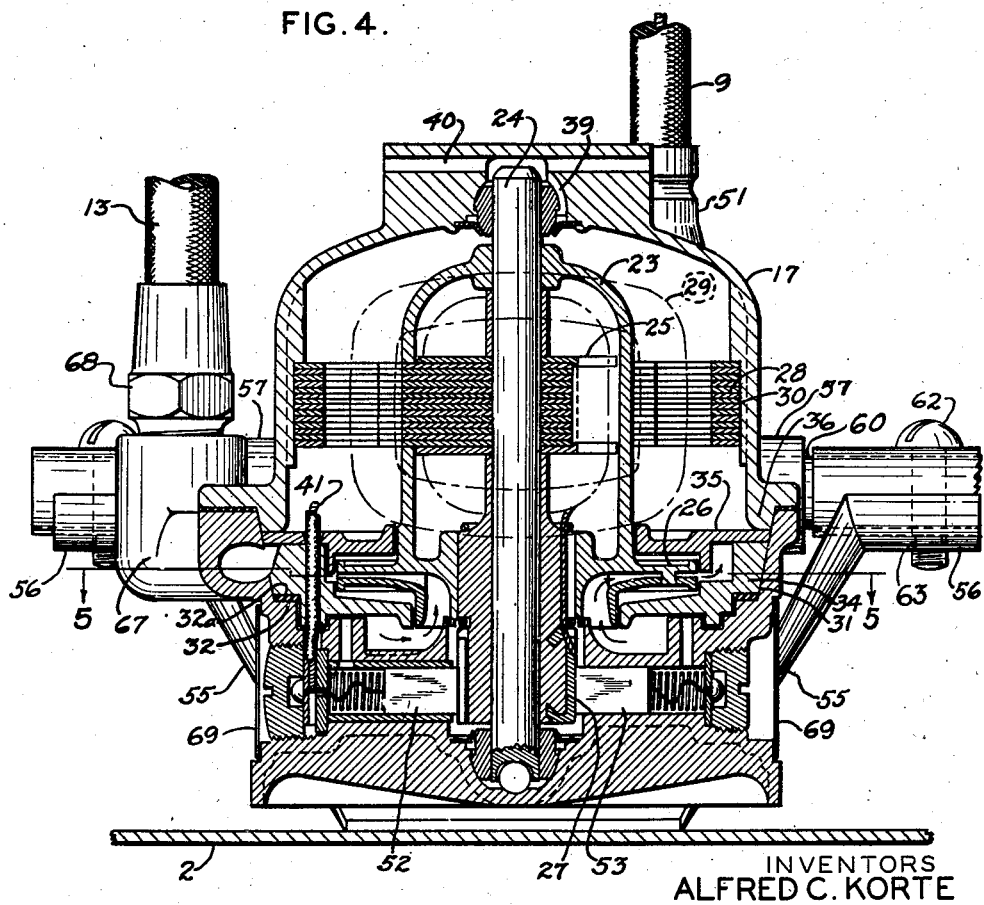

Feb. 3, 1942.  A. C. KORTE ET AL  2,271,560
FUEL PUMP MOUNTING
Original Filed April 20, 1940   4 Sheets-Sheet 4

INVENTORS
ALFRED C. KORTE
KENNETH LANNERT

ATTORNEY

Patented Feb. 3, 1942

2,271,560

UNITED STATES PATENT OFFICE 2,271,560

FUEL PUMP MOUNTING

Alfred C. Korte, St. Louis, and Kenneth Lannert, St. Johns Station, Mo., assignors to Carter Carburetor Corporation, St. Louis, Mo., a corporation of Delaware Original application April 20, 1940, Serial No. 330,704, now Patent No. 2,260,946, dated October 28, 1941. Divided and this application March 18, 1941, Serial No. 383,922

4 Claims. (Cl. 248—15)

This invention relates to automotive fuel pumps and more particularly to electrically operated centrifugal fuel pumps and their installation in fuel supply tanks. This application is a division of our co-pending application, Serial No. 330,704, filed April 20, 1940 which matured into Patent No. 2,260,946 October 28, 1941.

A problem to be solved when mounting electric fuel pumps in fuel storage tanks is the elimination of objectionable noise caused by pump vibration. Although vibration may be reduced to a minimum by proper pump design, it is quite obvious that even vibrations of very small amplitude will be, if not arrested by proper dampening means, transmitted to the comparatively thin metal panels of the supply tank through the mounting and will therein be greatly amplified and resounded.

It is an object of the present invention to provide novel resilient mounting means for interior tank mounted fuel pumps of the above character, which is universally adaptable.

It is a further object of the present invention to provide a novel electrical conductor for an interior tank mounted fuel pump.

Further objects and advantages will become apparent upon referring to the following description and accompanying drawings in which:

Fig. 3 is a vertical section taken on line 3—3 of Fig. 2.

Fig. 4 is a vertical section taken on line 4—4 of Fig. 2.

Fig. 10 is an enlarged detailed view of the electrical connector attached to the top of the fuel tank.

Fig. 11 is a sectional view of the electrical connector shown in Fig. 10.

Figure 1:
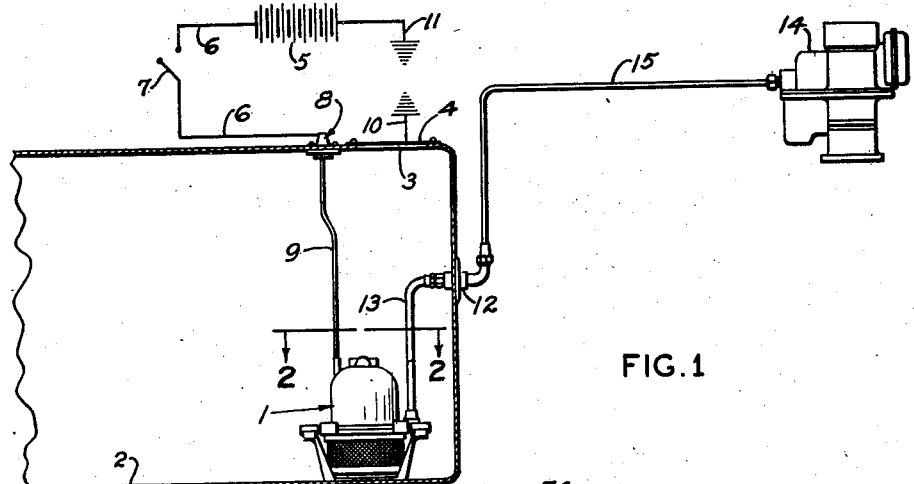
Fig. 1 is a schematic illustration of a fuel supply system for an internal combustion engine comprising a fuel pump and mounting constructed in accordance with the present invention.
Figure 2:
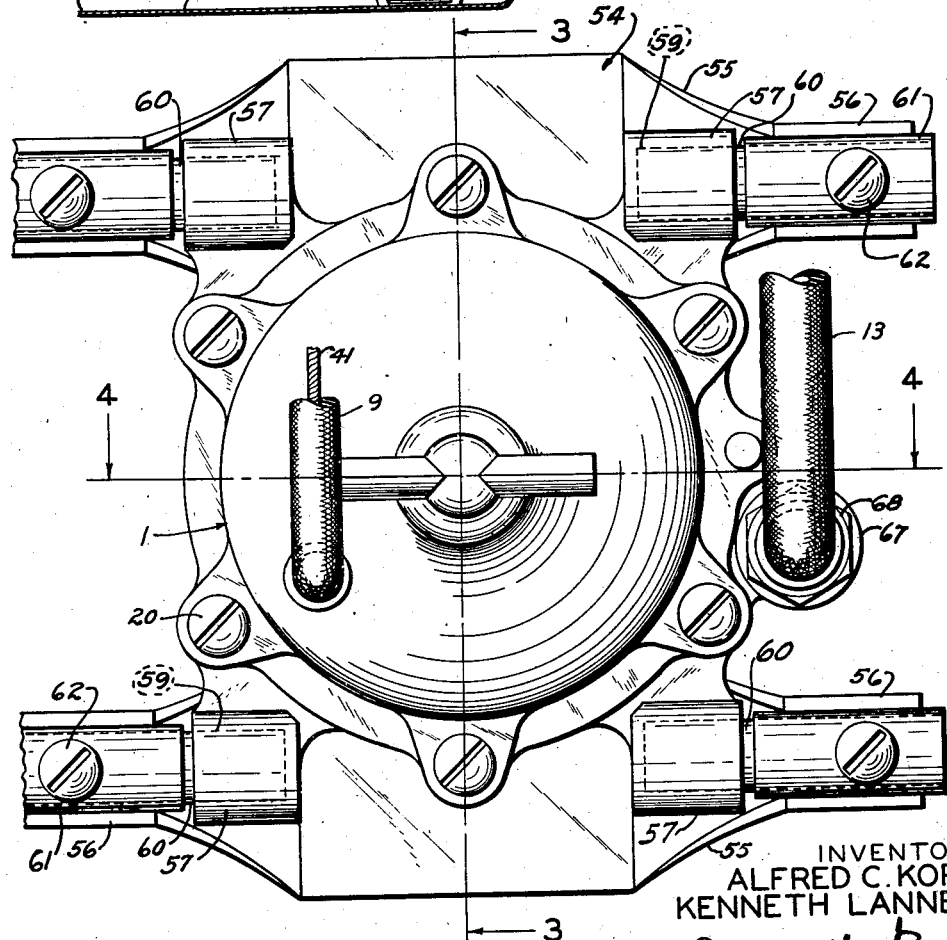
Fig. 2 is a plan view of the fuel pump and mounting taken on line 2—2 of Fig. 1.
Figure 5:
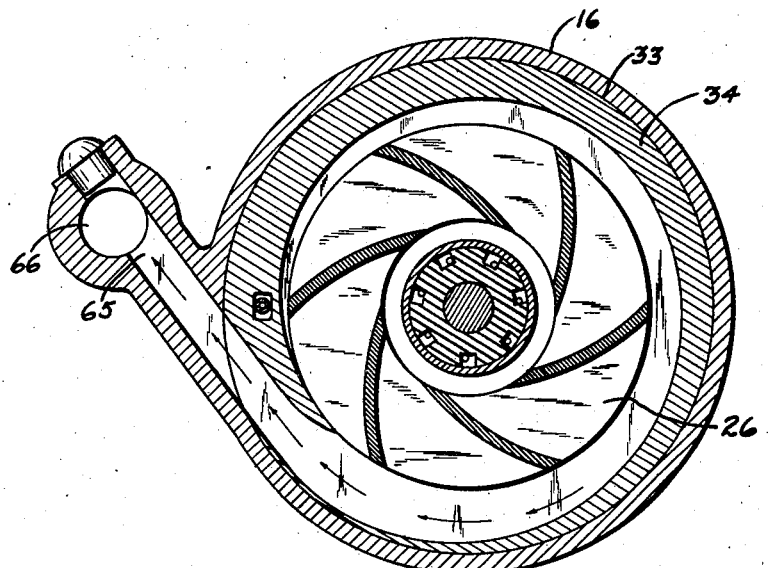
Fig. 5 is a transverse section taken on line 5—5 of Fig. 4, through the impeller and volute.

Referring to the drawings numeral 1 generally indicates an electrically driven centrifugal pump which is mounted in and on the bottom of a fuel storage tank 2. A hand-hole 3 in the top of the tank provides access to the pump. The hand-hole is provided with a cover plate 4. Electrical energy for the operation of the pump is supplied by a storage battery indicated at 5 and is conducted thereto through a circuit comprising a conductor 6 having a switch 7 interposed therein, a connector generally indicated at 8, a two-way conductor, generally indicated at 9, and grounds 10 and 11. Fuel is conducted from the pump to a tank fitting 12 by means of a flexible conductor 13 constructed of fuel resistant material, and therefrom to a carburetor 14 by means of a fuel line 15.

The fuel pump 1 comprises a lower casing 16 and an upper casing 17 which are attached by means of their respective flanges 18 and 19 and attaching screws 20. A sealing gasket 20a is provided between flanges 18 and 19. Rotating within the upper and lower casing and bearing in the respective ends 21 and 22 thereof is a rotor 23, which comprises, in rigid assembly, on a rotor shaft 24, an armature 25, an impeller 26 and a commutator 27. A laminated field frame 28 carrying a field winding 29 indicated by broken line is provided. The field frame is assembled in the upper casing 17 by press-fitting into the several vertical ribs or ways 30. The ribs 30 are comparatively narrow and are disposed in a circular formation which is concentrically true with the bearing end 21.

Figure 8:
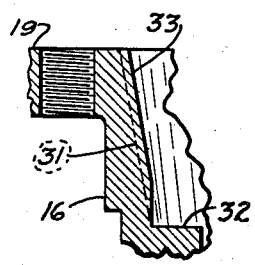
Fig. 8 is a sectional view of Fig. 7 taken on line 8—8.
Figure 9:
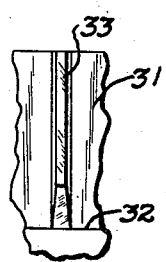
Fig. 9 is an elevation of Fig. 7 viewed on line 9—9.

The lower pump casing 16 is provided with a short tapered bore 31 at its upper end which terminates in a shoulder 32. Rising from the surface of bore 31 are a number of ribs 33 which are shown, enlarged out of proportion, in views Figs. 7, 8 and 9. Attempts to show these ribs in true proportion in the several views has been avoided for the reason that in practice it will be desirable to minimize the height to which they rise above the surface of the bore and which will probably be less than .015 of an inch. The ribs 33 are parallel to the surface of the bore 31.

Assembled in the bore 31 by press fitting is a circular volute member 34, a circular volute cover 35 and the lower tapered portion 36 on the top casing 17. The edges or rims of both members 34 and 35 and the lower portion 36 of casing 17 have substantially the same taper as bore 31. The volute member 34 and the cover 35 are firmly pressed downward by the lower end 36 of the top casing as the attaching screws 20 are tightened. A comparatively soft compressible ring gasket 32a is provided between volute member 34 and shoulder 32 which provides a seal and permits sufficient take-up of screws 20 to tightly compress the upper gasket 20a. In assembly the ribs 33 are compressed and flattened to a greater or lesser degree depending upon the dimensions of the components. It will be seen that by providing a tapered press fit assembly of the volute and its cover and of the upper and lower casing, concentricity which is highly essential, is assured.

Figure 7:
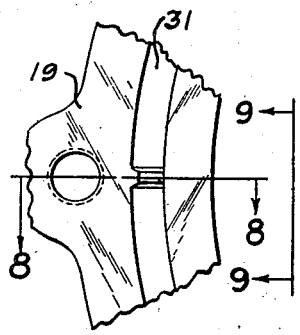
Fig. 7 is an enlarged fragmentary plan view of the lower pump casing taken on line 7—7 of Fig. 3, other assembled components being removed.
Figure 6:
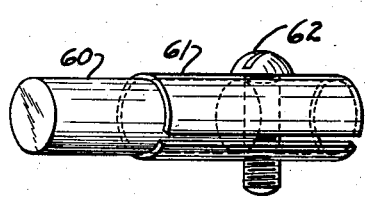
Fig. 6 is an enlarged detail of the resilient pump support and clamping tube.

By provision of the ribs 33, which are compressible by reason of their proportion, the manufacturer may work within limits ranging from a metal to metal fit to a substantial press fit. He may, therefore, allow the reasonable tolerances so necessary to economical production without sacrificing accuracy in assembly. A further advantage to be gained by provision of ribs 33 is that disassembly is greatly facilitated due to the fact that these ribs may be permanently distorted by reason of their dimensions without distorting the casing components. It is desirable that the ribs 33 be located immediately adjacent the attaching screws, as indicated in Fig. 7, for the reason that pressure applied by tightening these screws is thereby transmitted more directly to the points of resistance, this eliminates the possibility of distorting the top casing flange 19.

For journalling the ends of rotor shaft 24 a pair of radial self-aligning bearings 37 retained in the upper and lower ends of the pump casing by suitable retainers 38 are provided and to take the vertical thrust a ball thrust bearing 37a is provided. The upper casing 17 is further provided with vent passages 39 and 40 for the purpose of relieving pressure which may build up in the upper chamber which is defined by the casing 17 and the volute cover 35.

The two-way electrical conductor 9 comprises a flexible central conductor 41 which is surrounded by an insulator 42 which, in turn, is surrounded by a flexible, braided covering 43 which also serves as a conductor. The inner conductor 41 is connected to the conductor 6 and the outer conductor 43 is connected to the metal fuel tank 2 by means of the connector 8 which is inserted upwardly through a perforation in the top of tank 2. The connector 8 comprises a non-conducting member 44 having an upwardly extending bore which receives the conductor 9. The inner conductor 41 is farther extended upwardly and is connected to conductor 6 through the insert 45 and screw 46. The non-conducting member 44 is provided with a lower flange portion 47 which provides a stopping shoulder. A cup-shaped retainer 48 attached to the underside of the top of the tank by screws 49 firmly holds the member 44 in place. The retainer 48 is provided with a central perforation through which passes the conductor 9, and a plurality of surrounding, downwardly formed tangs 50 which, after the insertion of conductor 9, are formed inward to rigidly clamp the conductor in place. The other end of conductor 9 is clamped in a perforated boss 51 on the casing 17 by rotary swaging. The inner conductor 41 extends downwardly into the pump casing and is connected to the field 29 and the commutator brush 52. Brush 52 is insulated from the pump casing. The armature is grounded to the pump casing through brush 53, and the outer casing 43 of conductor 9 completes the ground to the tank 2. Tank 2 is usually grounded to the frame in most automotive installations as well as the battery.

The pump is mounted on a pair of U-shaped brackets 54 which may be spot-welded or rigidly attached at their base in any suitable manner to the bottom of tank 2. The upwardly extending bracket legs 55 have their end portions 56 formed so as to be substantially horizontal. The edges of ends 56 are further formed upward to result in their having a semi-circular section. Four cylindrical bosses 57 cast integral with the lower pump casing are provided. The brackets 54 are so arranged with respect to the pump that the axis of the cylindrical bosses 57 coincide with an axis through the center of the semi-circular bracket end portion 56. The bosses 57 have longitudinal blind bores 59 which receive one end of the resilient cylindrical shear pins 60. We prefer to construct the pins 60 of a commercial synthetic material having properties similar to rubber, except that they shall not be affected by gasoline as rubber is. The other ends of pins 60 are inserted in split clamping tubes 61. Tubes 61 are provided with through perforations to receive screws 62. The bracket end portions 56 are also perforated and internally screw threaded as indicated at 63 to receive screws 62.

In assembly, one end of a resilient pin 60 is inserted in a clamp tube 61, the other end into a bore 59 in a boss 57. A screw 62 is then inserted through the tube 61 and tightly engaged in a threaded bracket end 56 thereby tightly clamping the pin in the split tube and attaching both to the bracket.

Pump casing 16 is further provided with inlet ports 64. A discharge port 65 and a short outlet riser 66 formed in an outlet boss 67. The outlet boss being internally screw threaded to receive a conduit fitting 68. A circular screen 69 covering inlet port 64 is provided.

In operation, fuel flows into the lower casing through port 64, from whence it flows in the direction of the arrows into the central opening of the impeller 26, from where it is thrown by centrifugal force outward through the volute channel and port 65.

The detailed drawings and description are intended to be illustrative, not limiting and the use of all modifications within the scope of the appended claims is contemplated.

We claim:

1. In a fuel pump, a casing having a plurality of horizontal bores, generally cylindrical resilient shear members having one end inserted in said bores and having their other ends projecting, split sleeve clamps surrounding said projecting ends, brackets for supporting said projecting ends, and screw threaded means for tightening said clamps and attaching said clamps to said brackets.

2. In a fuel pump, a casing, resilient supporting structure comprising U-shaped brackets, and resilient shear members carried by said casing and projecting horizontally therefrom, each of said shear members being supported by a vertical leg of one of said brackets.

3. In a fuel pump, a casing having a plurality of horizontal recesses, mounting structure for resiliently supporting said pump comprising a plurality of resilient members received on one end in said horizontal recesses and projecting substantially horizontally from said casing, and bracket means for supporting the projecting ends of said resilient members.

4. In a fuel pump, pump housing structure having recesses formed therein, mounting structure for said pump comprising resilient connector elements received in said recesses and projecting substantially from said housing, clamping members attached to the projecting ends of said resilient connector elements, rigid support means adapted to receive said clamping members, and screw threaded means for attaching said clamping members to said support means.

ALFRED C. KORTE.
KENNETH LANNERT.